(12) United States Patent
Miranda Lujan et al.

(10) Patent No.: US 11,021,114 B2
(45) Date of Patent: Jun. 1, 2021

(54) DOOR TRIM ASSEMBLY WITH BRACKET JOINING THE ARMREST AND THE PULL HANDLE OF THAT ASSEMBLY

(71) Applicant: FORD GLOBAL TECHNOLOGIES, LLC, Dearborn, MI (US)

(72) Inventors: Jesus Miranda Lujan, Mexico City (MX); Sandra Cristina Alvarado Gomez, Cd. López Mateos (MX); Joseph Andrew Hickey, Rochester, MI (US); Bhavani S. Thota, Novi, MI (US); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 16/103,373

(22) Filed: Aug. 14, 2018

(65) Prior Publication Data
US 2020/0055463 A1 Feb. 20, 2020

(51) Int. Cl.
*B60R 13/02* (2006.01)
*B60J 5/04* (2006.01)
*B60N 2/75* (2018.01)

(52) U.S. Cl.
CPC ......... *B60R 13/0206* (2013.01); *B60J 5/0468* (2013.01); *B60N 2/78* (2018.02); *B60R 13/0243* (2013.01)

(58) Field of Classification Search
CPC .......... B60N 2/78; B60N 2/4235; B60N 2/77; B60N 2/42709; B60N 2/763; B60N 2/777; B60N 2/783; B60N 3/02; B60R 13/0243; B60R 2013/0287; B60R 2013/0293; B60J 5/0468; B60J 5/06; B60J 11/06; B60J 11/08; B60J 1/20; B60J 5/04; B60J 5/042; B60J 5/0434; B60J 5/0451
USPC ....... 296/153, 1.09, 146.7, 187.05, 1.02, 98, 296/65.02, 70; 297/411.21, 115, 216.1, 297/217.3; 428/156, 161, 191, 76, 314.4
See application file for complete search history.

(56) References Cited

U.S. PATENT DOCUMENTS

| | | | |
|---|---|---|---|
| 4,226,464 A | * | 10/1980 | Janz .................. A47C 7/54 248/118 |
| 6,905,163 B2 | | 6/2005 | Bornchen et al. |
| 7,055,888 B2 | * | 6/2006 | Reed .................. B60N 2/7017 296/153 |
| 7,121,611 B2 | | 10/2006 | Hirotani et al. |
| 7,794,009 B2 | | 9/2010 | Pinkerton et al. |

(Continued)

FOREIGN PATENT DOCUMENTS

DE 102014000734 A1 8/2014
JP 2009269414 A 11/2009

OTHER PUBLICATIONS

English Machine Translation of DE102014000734A1.
English Machine Translation of JP2009269414A.

*Primary Examiner* — D Glenn Dayoan
*Assistant Examiner* — Sunsurraye Westbrook
(74) *Attorney, Agent, or Firm* — David Coppiellie; King & Schickli, PLLC

(57) ABSTRACT

A door trim assembly includes an armrest, a pull handle, including a receiver, and a bracket joining the armrest and the pull handle. The bracket includes a connection feature that engages with the receiver. The bracket is cantilevered to the pull handle and includes a second end with an abutment surface engaging the armrest.

18 Claims, 4 Drawing Sheets

(56) References Cited

U.S. PATENT DOCUMENTS

| | | | | |
|---|---|---|---|---|
| 7,871,119 B2* | 1/2011 | Schoemann | ........ | B60R 13/0243 |
| | | | | 296/146.7 |
| 9,156,387 B2 | 10/2015 | Jadhav et al. | | |
| 2007/0108830 A1* | 5/2007 | Hessler | ................ | B60N 2/4235 |
| | | | | 297/411.21 |
| 2015/0232001 A1* | 8/2015 | Orona | .................... | B60N 2/783 |
| | | | | 248/118 |

* cited by examiner

DOOR TRIM ASSEMBLY WITH BRACKET JOINING THE ARMREST AND THE PULL HANDLE OF THAT ASSEMBLY

TECHNICAL FIELD

This document relates generally to the motor vehicle equipment field and, more particularly, to a new and improved door trim assembly incorporating an armrest, a pull handle and a bracket joining the armrest and the pull handle.

BACKGROUND

Under certain conditions, the force of a motor vehicle side impact is transmitted directly from the door inner to the pull handle area, forcing intrusion into the passenger compartment and potentially separating the pull handle and the armrest of the door trim assembly.

This document relates to a new and improved door trim assembly wherein a bracket joins the armrest and the pull handle. Advantageously, the bracket transmits the force of the side impact to both the pull handle and the armrest, pushing and maintaining them together without breaking. As a result, this discontinuity between the armrest and pull handle may be prevented thereby enhancing occupant safety.

SUMMARY

In accordance with the purposes and benefits as described herein, a new and improved door trim assembly is provided. That door trim assembly comprises: (a) an armrest, (b) a pull handle, including a receiver, and (c) a bracket joining the armrest and the pull handle. The bracket includes a connection feature engaged with the receiver of the pull handle.

That receiver may include two opposed channels. The connection feature may include two opposed tabs engaged in the two opposed channels of the pull handle.

The bracket may further include a first end flange and a second end flange. At least one fastener may be provided to secure the first end flange to the pull handle. The second end flange may include an abutment surface engaging the armrest and, more particularly, the back side or outboard surface of the armrest substrate.

Still further, the bracket may include a plurality of ribs extending between the first end flange and the second end flange. The bracket may also be cantilevered to the pull handle of the first end flange.

A portion of the armrest may be captured between the second end flange and the pull handle. Such a structural feature not only enhances the aesthetic appearance of the armrest but also improves the integrity of the interconnection of the pull handle and armrest provided by the bracket.

In the following description, there are shown and described several preferred embodiments of the door trim assembly. As it should be realized, the door trim assembly is capable of other, different embodiments and its several details are capable of modification in various, obvious aspects all without departing from the door trim assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the door trim assembly and together with the description serve to explain certain principles thereof.

Reference will now be made in detail to the present preferred embodiments of the support and door trim assembly, examples of which are illustrated in the accompanying drawing figures.

DETAILED DESCRIPTION

Reference is now made to FIGS. 1-4 illustrating the new and improved door trim assembly 10. That door trim assembly 10 includes an armrest 12, a pull handle 14 and a bracket 16 joining the armrest and the pull handle.

Figure 3:
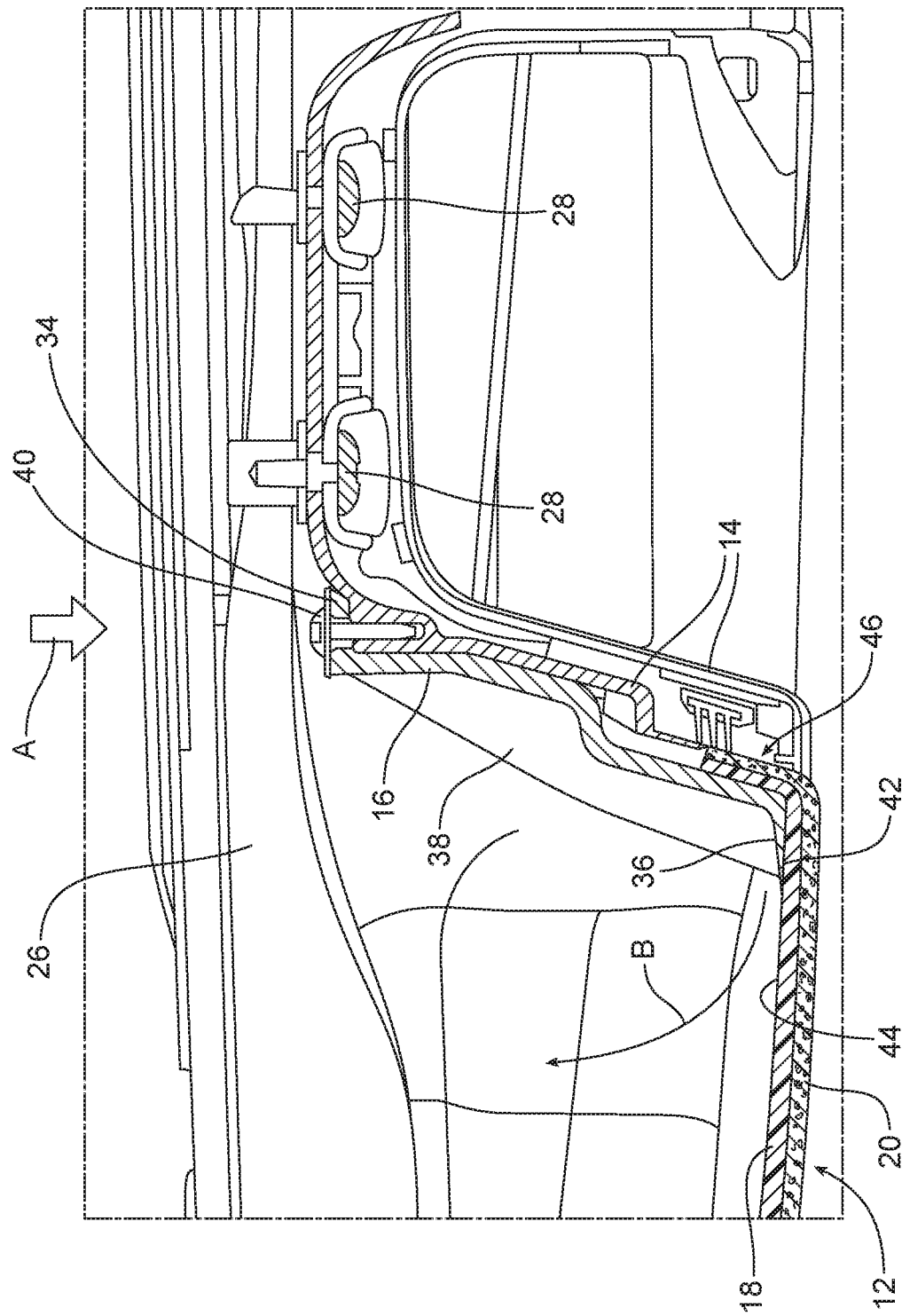
FIG. 3 is a longitudinal cross sectional view through the bracket, the pull handle and the armrest at line 3-3 in FIG. 2.
Figure 4:
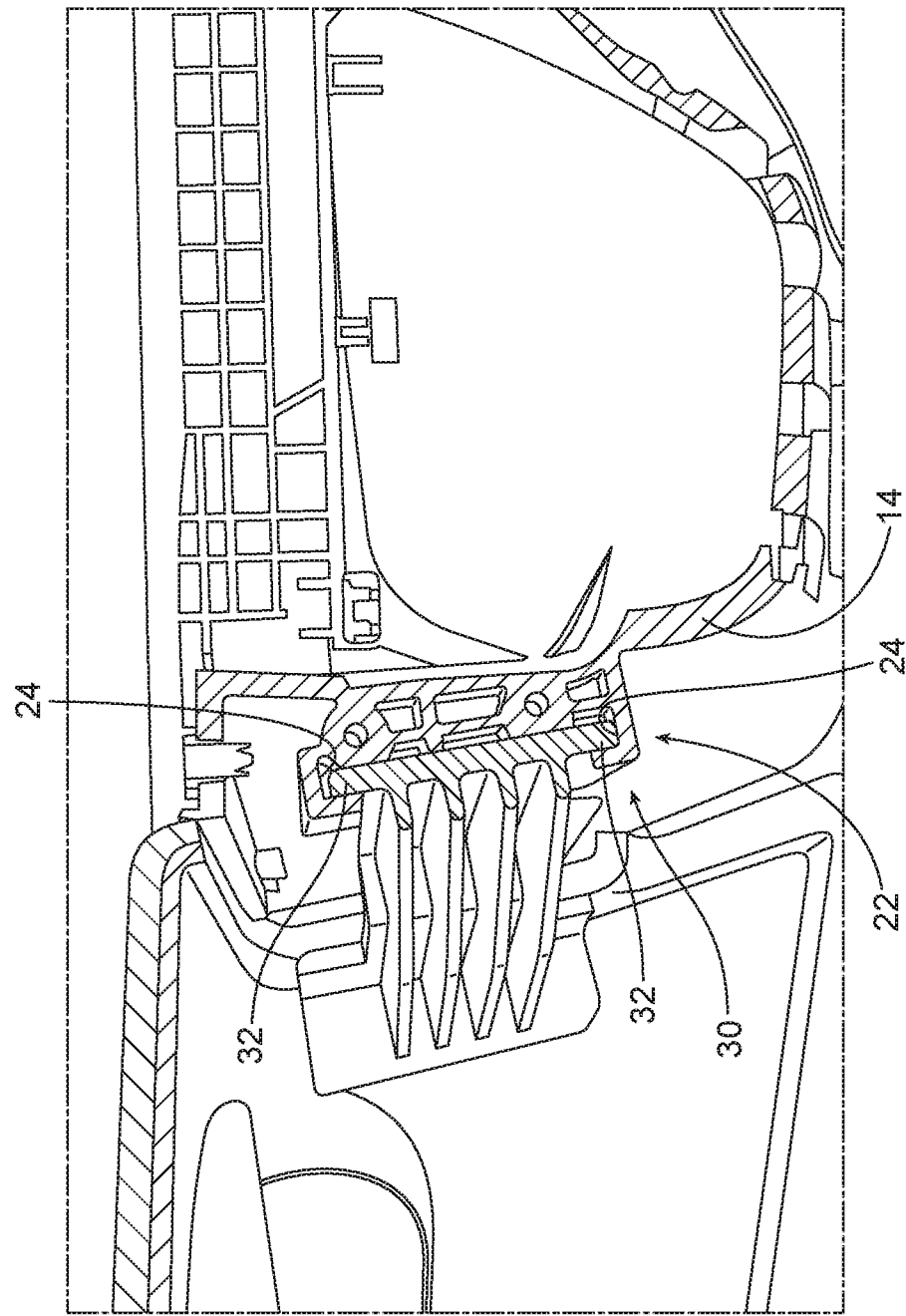
FIG. 4 is a transverse cross sectional view through the bracket, the pull handle and the armrest at line 4-4 in FIG. 2.

More particularly, as best illustrated in FIGS. 3 and 4, the armrest 12 includes an armrest substrate 18 and a decorate armrest cover layer 20 adapted to provide an aesthetically pleasing appearance to the armrest 12. The armrest substrate 18 may be made from any number of appropriate materials including, but not necessarily limited to, plastics, composites of different materials, natural or processed fiber composites and metals. The armrest cover layer 20 may be made from any number of materials including, but not necessarily limited to fabric, vinyl, polyvinyl chloride (PVC), thermoplastic elastomer (TPE), thermoplastic olefin (TPO), cloth, alcantara, leather, and composites of different materials.

As best illustrated in FIG. 4, the pull handle 14 includes a receiver 22. In the illustrated embodiment, the receiver 22 comprises two opposed channels 24 that open toward each other. The pull handle 14 may be made from any appropriate material including but necessarily limited to, plastics, composites of different materials, natural or processed fiber composites and metals. The pull handle 14 may be mounted directly to the door inner 26 by the fasteners 28. See FIG. 3.

The bracket 16 includes a connection feature, generally designated by reference numeral 30, that engages with the receiver 22 and connects the bracket to the pull handle 14. In the illustrated embodiment, the connection feature 30 includes two opposed tabs 32 that slide into and engage in the two opposed channels 24 of the pull handle 14 (again, see FIG. 4).

Figure 1:
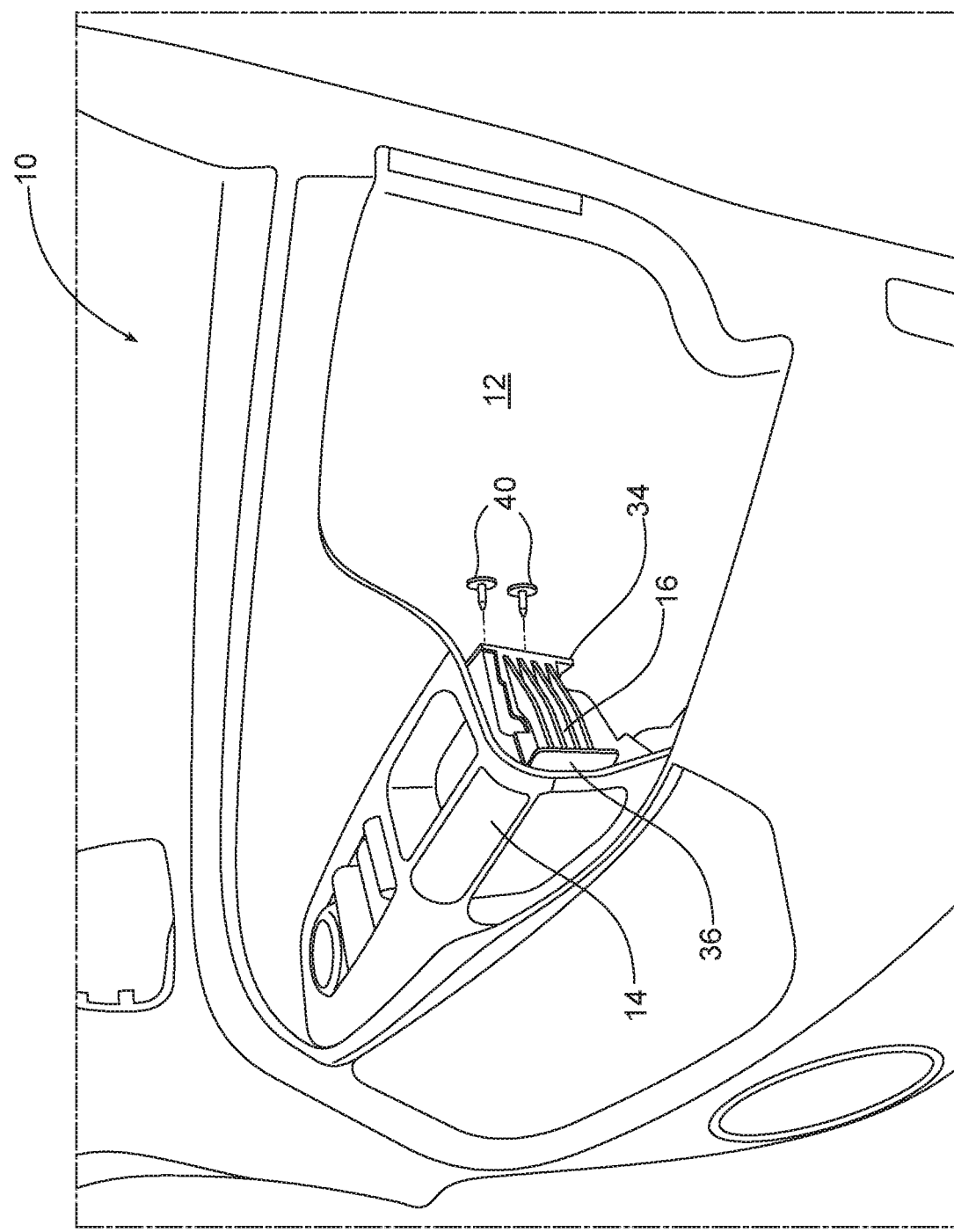
FIG. 1 is a partially cut away, perspective view of the door trim assembly showing the pull handle, the armrest and the bracket joining the pull handle and the armrest.
Figure 2:
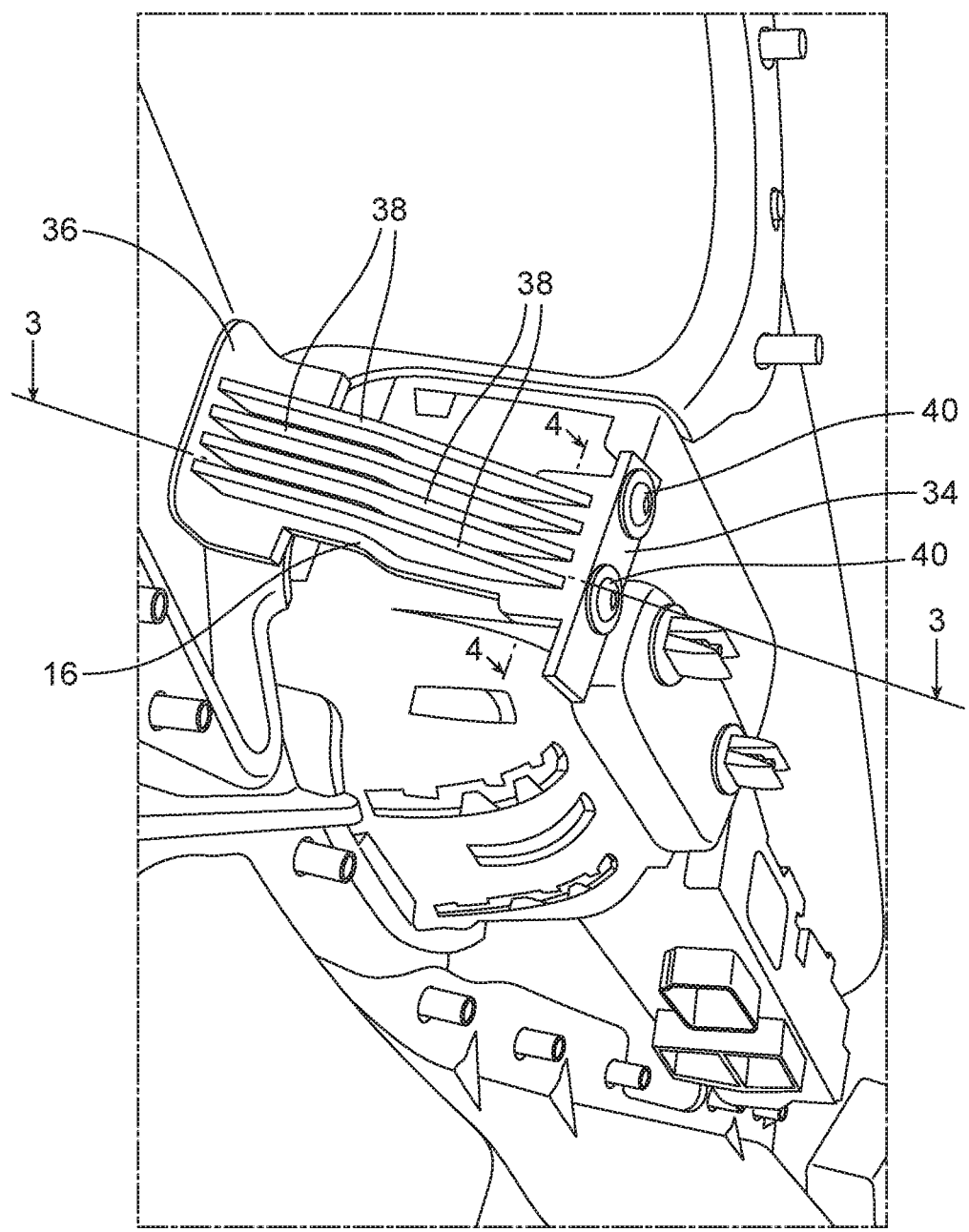
FIG. 2 is a detailed perspective view illustrating the inner connection of the bracket to the pull handle and the engagement of the second end flange of the bracket with the backs or outboard side of the armrest.

As best illustrated in FIGS. 2-4, the bracket 16 includes a first end flange 34, a second end flange 36 and a plurality of ribs 38 extending between the first end flange and the second end flange. At least one fastener 40 secures the first end flange 34 to the pull handle 14. More particularly, in the illustrated embodiment, two fasteners 40 are shown. The second end flange 36 includes an abutment surface 42 that abuts with the back side or outboard surface 44 of the armrest substrate 18. A portion 46 of the armrest 12, including both the edges of the armrest substrate 18 and the armrest cover layer 20, is captured between the bracket 16 and the pull handle 14 near the second end flange 36. In the illustrated embodiment, the bracket 16 is cantilevered to the pull handle 14 and only abuts but is not fastened to the armrest 12.

As should be appreciated, the bracket 16 is securely fastened to the pull handle 14 by engagement of the connection feature 30, (including, particularly, the opposed tabs 32), in the receiver 22, (including, particularly, the opposed channels 24) and the two fasteners 40. As noted previously, the bracket 16 of the illustrated embodiment is not fastened to the armrest 12: it is just a touch condition between those components.

When a side impact occurs (note force arrow A in FIG. 3), the force is transmitted directly from the door inner 26 to the pull handle 14 and then through the bracket 16 to the armrest 12 by means of the abutment of the second end flange 36 with the back side or outboard surface 44 of the armrest substrate 18. As a result, the pull handle 14 and armrest 12 are pushed inboard together without separating. The cantilever design of the bracket 16 provides a friction interference fit with the armrest 12 that helps relieve the force of the impact without breaking the armrest 12 as the bracket 16 rotates in the direction of action arrow B about a pivot point near the fasteners 40 and the interlocked receiver 22 and connection feature 30 while avoiding separation between the armrest 12 and the pull handle 14.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A door trim assembly, comprising:
   an armrest;
   a pull handle including a receiver, said receiver including two opposed channels opening toward one another; and
   a bracket joining said armrest and said pull handle, said bracket including a connection feature engaged with said receiver, said connection feature including two opposed tabs extending away from one another.

2. The door trim assembly of claim 1, wherein said two opposed tabs engage in said two opposed channels.

3. The door trim assembly of claim 2, wherein said bracket includes a first end flange and a second end flange.

4. The door trim assembly of claim 3, further including at least one fastener securing said first end flange to said pull handle.

5. The door trim assembly of claim 4, wherein said second end flange includes an abutment surface engaging said armrest.

6. The door trim assembly of claim 5, wherein said bracket includes a plurality of ribs extending between said first end flange and said second end flange.

7. The door trim assembly of claim 6, wherein said bracket is cantilevered to said pull handle.

8. The door trim assembly of claim 7, wherein a portion of said armrest is captured between said second end flange and said pull handle.

9. The door trim assembly of claim 1, wherein said bracket includes a first end flange and a second end flange.

10. The door trim assembly of claim 9, further including at least one fastener securing said first end flange to said pull handle.

11. The door trim assembly of claim 10, wherein said second end flange includes an abutment surface engaging said armrest.

12. The door trim assembly of claim 11, wherein said bracket includes a plurality of ribs extending between said first end flange and said second end flange.

13. The door trim assembly of claim 12, wherein said bracket is cantilevered to said pull handle at said first end flange.

14. The door trim assembly of claim 13, wherein a portion of said armrest is captured between said second end flange and said pull handle.

15. The door trim assembly of claim 1, wherein said bracket is cantilevered to said pull handle at a first end flange.

16. The door trim assembly of claim 15, wherein a portion of said armrest is captured between a second end flange and said pull handle.

17. The door trim assembly of claim 16, wherein said bracket includes a plurality of ribs extending between said first end flange and said second end flange.

18. The door trim assembly of claim 17, wherein said connection feature includes at least one fastener securing said first end flange to said pull handle.

* * * * *